US012643689B2

(12) United States Patent
Lee et al.

(10) Patent No.: US 12,643,689 B2
(45) Date of Patent: Jun. 2, 2026

(54) MARMAN RING ATTACHMENT MECHANISM

(71) Applicant: Katalyst Space Technologies, LLC, Flagstaff, AZ (US)

(72) Inventors: Ghonhee Lee, Flagstaff, AZ (US);
Jason Herman, Flagstaff, AZ (US);
Dawson Pursell, Flagstaff, AZ (US);
Hunter Robertson, Flagstaff, AZ (US);
Andrew Sabovik, Flagstaff, AZ (US)

(73) Assignee: Katalyst Space Technologies, LLC, Flagstaff, AZ (US)

( * ) Notice: Subject to any disclaimer, the term of this patent is extended or adjusted under 35 U.S.C. 154(b) by 18 days.

(21) Appl. No.: 18/745,108

(22) Filed: Jun. 17, 2024

(65) Prior Publication Data

US 2025/0269985 A1 Aug. 28, 2025

Related U.S. Application Data

(63) Continuation-in-part of application No. 18/588,784, filed on Feb. 27, 2024, and a continuation-in-part of
(Continued)

(51) Int. Cl.
*B64G 4/00* (2006.01)
(52) U.S. Cl.
CPC ...................................... *B64G 4/00* (2013.01)
(58) Field of Classification Search
CPC ...................................................... B64G 4/00
See application file for complete search history.

(56) References Cited

U.S. PATENT DOCUMENTS 4,324,057 A * 4/1982 White .................. E02F 9/2841
37/457
4,880,050 A 11/1989 Nakamura et al.
(Continued)

FOREIGN PATENT DOCUMENTS

JP 2012504522 B2 2/2012
WO WO-144050 A1 6/2001
(Continued)

OTHER PUBLICATIONS

Non-Final Office Action for U.S. Appl. No. 18/588,784 dated Mar. 11, 2025.
(Continued)

*Primary Examiner* — Mark A Williams
(74) *Attorney, Agent, or Firm* — Law Offices of Damon L. Boyd, PLLC

(57) ABSTRACT

A clamp for attachment to a satellite, wherein the satellite is without an independent attachment interface for receiving the clamp, comprising a baseplate for attachment to the component, a motor and a drive assembly, a linear motion axis, a stop, a first tooth assembly and a second tooth assembly, and wherein, actuation of the motor and the drive assembly translates the linear motion axis such that at least one of the first tooth assembly and second tooth assembly contract to clamp on to a Marman ring on the satellite. The tooth assemblies may be combinations of rigid teeth and camming teeth which pivot to secure and pull the clamp orthogonal to the contracting direction and towards the Marman ring.

7 Claims, 8 Drawing Sheets

Related U.S. Application Data application No. 18/143,780, filed on May 5, 2023, now Pat. No. 11,945,605, and a continuation-in-part of application No. 18/143,744, filed on May 5, 2023, now abandoned, and a continuation-in-part of application No. 18/035,570, filed as application No. PCT/IB2021/060284 on Nov. 5, 2021, now abandoned.

(56) References Cited

U.S. PATENT DOCUMENTS

| | | | | |
|---|---|---|---|---|
| 5,152,482 | A | 10/1992 | Perkins et al. | |
| 5,806,803 | A | 9/1998 | Watts | |
| 5,954,298 | A | 9/1999 | Basuthakur et al. | |
| 6,032,390 | A * | 3/2000 | Bierwith | E02F 9/2841 |
| | | | | 403/374.1 |
| 6,675,095 | B1 | 1/2004 | Bird | |
| 7,131,484 | B2 | 11/2006 | Gayrard et al. | |
| 7,866,607 | B2 | 1/2011 | Benedict | |
| 8,193,968 | B1 | 6/2012 | Kia et al. | |
| 8,511,614 | B2 | 8/2013 | Robinson | |
| 8,979,034 | B2 | 3/2015 | Goff et al. | |
| 9,008,864 | B2 | 4/2015 | Ploschnitznig | |
| RE46,206 | E | 11/2016 | Jorgenson | |
| 9,829,253 | B2 | 11/2017 | Mishkinis et al. | |
| 10,614,544 | B2 | 4/2020 | Jia et al. | |
| 10,773,394 | B2 | 9/2020 | Jiang et al. | |
| 2002/0023375 | A1 * | 2/2002 | Pippins | E02F 9/2833 |
| | | | | 37/456 |
| 2003/0159845 | A1 | 8/2003 | Lukas | |
| 2006/0192057 | A1 | 8/2006 | Smith et al. | |
| 2008/0265098 | A1 | 10/2008 | Connelly et al. | |
| 2011/0226907 | A1 | 9/2011 | Robinson | |
| 2013/0070666 | A1 | 3/2013 | Miller et al. | |
| 2013/0249229 | A1 * | 9/2013 | Roberts | B25J 19/0091 |
| | | | | 294/198 |
| 2014/0332632 | A1 * | 11/2014 | Helmer | B64G 1/642 |
| | | | | 244/173.2 |
| 2015/0053823 | A1 | 2/2015 | Bigelow | |
| 2015/0069188 | A1 * | 3/2015 | Allen | B64G 4/00 |
| | | | | 244/172.2 |
| 2016/0320469 | A1 | 11/2016 | Laifenfeld | |
| 2017/0036783 | A1 | 2/2017 | Snyder | |
| 2017/0264022 | A1 | 9/2017 | Mroczek | |
| 2018/0297724 | A1 | 10/2018 | Harvey et al. | |
| 2019/0023422 | A1 | 1/2019 | Nicholson et al. | |
| 2019/0210746 | A1 | 7/2019 | Feconda et al. | |
| 2019/0241286 | A1 | 8/2019 | Goff et al. | |
| 2021/0367669 | A1 | 11/2021 | Hand et al. | |
| 2024/0059430 | A1 * | 2/2024 | Harang | B64G 1/68 |

FOREIGN PATENT DOCUMENTS

| | | |
|---|---|---|
| WO | 2007109838 A1 | 10/2007 |
| WO | 2022097097 A1 | 5/2022 |

OTHER PUBLICATIONS

Nov. 15, 2021 to Invitation to Correct Defects in PCT/IB2021/060284.

Jan. 12, 2022 Reply to Invitation to Correct Defects in PCT/IB2021/060284.

Feb. 14, 2022 Invitation to Pay Fees in PCT/IB2021/060284.

Feb. 14, 2022 Reply to Invitation to Pay Fees in PCT/IB2021/060284.

Mar. 15, 2022 Written Opinion in PCT/IB2021/060284.

Mar. 15, 2022 International Search Report in PCT/IB2021/060284.

Apr. 19, 2022 Notification of Receipt of Priority Document in PCT/IB2021/060284.

Apr. 22, 2022 Request to Change Order of Inventors in PCT/IB2021/060284.

Apr. 25, 2022 Notification of the Recording of a Change in Order of Inventors in PCT/IB2021/060284.

May 12, 2022 Notice of Publication of International Application in PCT/IB2021/060284.

May 25, 2016 Gordon Roesler, RSGS Proposers Day.

May 22, 2019 Joseph Parrish, RSGS Proposers Day.

May 29, 2017 Reopening the American Frontier: Exploring How the Outer Space Treaty Will Impact American Commerce and Settlement in Space.

Apr. 23, 2008 Lane Haury, Applications of Recent Wireless Standards in Satellite Networking.

Jan. 8, 2014 Richard Alena, Wireless Space Plug-and-Play Architecture (SPA-Z).

Jun. 29, 2020, NASA SBIR 2020-I Solicitation Wireless Communication for Avionics and Sensors for Space Applications.

Aug. 28, 2023 Non-Final Office Action in U.S. Appl. No. 18/143,780.

Aug. 18, 2023 Non-Final Office Action in U.S. Appl. No. 18/143,744.

Nov. 14, 2023 Reply to Aug. 28, 2023 Non-Final Office Action in U.S. Appl. No. 18/143,780.

Nov. 29, 2023 Notice of Allowance in U.S. Appl. No. 18/143,780.

Nov. 15, 2023 Reply to Aug. 18, 2023 Non-Final Office Action in U.S. Appl. No. 18/143,744.

Nov. 28, 2023 Final Office Action in U.S. Appl. No. 18/143,744.

Dec. 6, 2023 Reply to Final Office Action in U.S. Appl. No. 18/143,744.

Dec. 14, 2023 Advisory Action in U.S. Appl. No. 18/143,744.

Oct. 6, 2023 Non-Final Office Action in U.S. Appl. No. 18/035,570.

Dec. 4, 2023 Reply to Oct. 6, 2023 Non-Final Office Action in U.S. Appl. No. 18/035,570.

Dec. 12, 2023 Final Office Action in U.S. Appl. No. 18/035,570.

Feb. 28, 2024 Issue Fee Payment for U.S. Appl. No. 18/143,780.

* cited by examiner

MARMAN RING ATTACHMENT MECHANISM

CROSS REFERENCE TO RELATED APPLICATIONS

This patent application is a continuation-in-part of U.S. patent application Ser. No. 18/588,784 entitled "ATTACHMENT SYSTEMS FOR AUGMENTING SATELLITES," filed on Feb. 27, 2024, U.S. patent application Ser. No. 18/143,780 entitled "MULTI-COMPONENT SATELLITE NETWORK," filed on May 5, 2023, and U.S. patent application Ser. No. 18/143,744 entitled "MULTI-COMPONENT MULTI-SATELLITE NETWORK," filed on May 5, 2023, and U.S. patent application Ser. No. 18/035,570 entitled "ATTACHMENT SYSTEMS FOR AUGMENTING SATELLITES," filed on May 5, 2023, which is a national stage entry application claiming priority under 35 U.S.C. § 371 (c) to PCT/IB2021/060284, entitled "DEVICES, SYSTEMS AND METHODS FOR AUGMENTING SATELLITES," filed Nov. 5, 2021, which is related to and claims priority under 35 U.S.C. § 119 (e) to U.S. Provisional Patent Application No. 63/198,692, entitled "NOVEL METHOD TO AUGMENT EXISTING SATELLITES WITH SITUATIONAL AWARENESS SENSING CAPABILITY," filed Nov. 5, 2020, all of which are incorporated by reference in their entirety for all purposes.

GOVERNMENT LICENSE RIGHTS

This invention was made with government support under contract FA8820-23-P-0001 awarded by the Department of the Air Force. The government has certain rights in the invention.

FIELD OF THE INVENTION

The invention relates to an attachment mechanism for facilitating the attachment of various components to a Marman ring of satellites, spacecraft, and other devices.

BACKGROUND

Satellite operations have remained essentially unchanged since 1957 when the first manmade object was launched into orbit. With the exception of the Hubble Space Telescope and the International Space Station, both of which required manned missions to service, satellites are launched with a certain level of hardware technology capability which does not change throughout the duration of the satellite's mission. Due to the long lifespans necessitated by the large, combined asset and launch costs, the result is outdated technology in space assets long before their end of life. In other words, while the rate of technological advancement is exponentially increasing, the traditional method of satellite development and operation has not been able to maintain this same pace due to the unit economics and cost of space access. As a result, technology on orbit significantly lags terrestrial capabilities on average and at any given point in time.

In this regard, satellite-based business models are bottlenecked by the current mode of satellite operations causing new, innovative business models to be economically infeasible. This is caused by two primary reasons-satellite operations and satellite design. As it relates to the traditional satellite design process, satellites are typically produced as a one-off design or a series of similar designs discretely designed to serve one specific set of mission objectives.

Designing and integrating satellites is costly and skilled-labor intensive, and the resulting product is not configured in a manner that can be easily upgraded with other components, particularly on-orbit in the case of on-orbit satellite servicing. Moreover, due to high asset cost and necessary long lifespan for full asset depreciation and return on investment under the current systems of satellite operations, the technology in orbit at any discrete point in time significantly lags the technology available terrestrially. The nature of these systems results in a relatively static commercial (and governmental) technological space marketplace as expansion into dynamic marketspaces with changing customer behavior is effectively infeasible due to financial considerations.

Thus, apparatus and methods that provide new ways to attach various components to Marman rings on satellites, spacecraft, and other devices, for purposes of, among others, upgrade, enhancement and satellite life extension are desirable.

SUMMARY

The present disclosure provides devices, apparatus and systems for attaching components to a Marman ring of satellites, spacecraft, and other devices such as a clamp, wherein the satellite is without an independent attachment interface for receiving the clamp, the clamp comprising a baseplate for attachment to the component, a motor and a drive assembly, a linear motion axis, a stop, a first tooth assembly and a second tooth assembly, and wherein, actuation of the motor and the drive assembly translates the linear motion axis such that at least one of the first tooth assembly and second tooth assembly contract to clamp on to an existing Marman ring (a conventional and known attachment fixture or separation ring commonly used on satellites and other spacecraft). As used herein, for convenience of reference, the term "satellite" should also be considered to encompass other spacecraft and devices as well. The tooth assemblies may be combinations of rigid teeth and camming teeth. Rigid teeth can create either single-axis or dual-axis clamping loads based on the designed geometry of the contact surfaces. Camming teeth can create dual-axis clamping loads based on pivot motion. The camming element is pivotally mounted within the body of a camming tooth structure, allowing it to rotate relative to the tooth structure. This pivotal movement may be caused by contact with a Marman ring of the host satellite when the first and second tooth begin to contract against the structural component, resulting in camming tooth rotation that exerts a clamping force orthogonal to the contracting direction. This orthogonal force application is achieved through the specific shape and orientation of the camming element's contact surfaces.

BRIEF DESCRIPTION OF THE DRAWINGS

The accompanying drawings provide a further understanding of the invention and are incorporated in and constitute a part of this specification, illustrate embodiments of the invention, and together with the description serve to explain the principles of the invention.

DETAILED DESCRIPTION

Figure 1A:
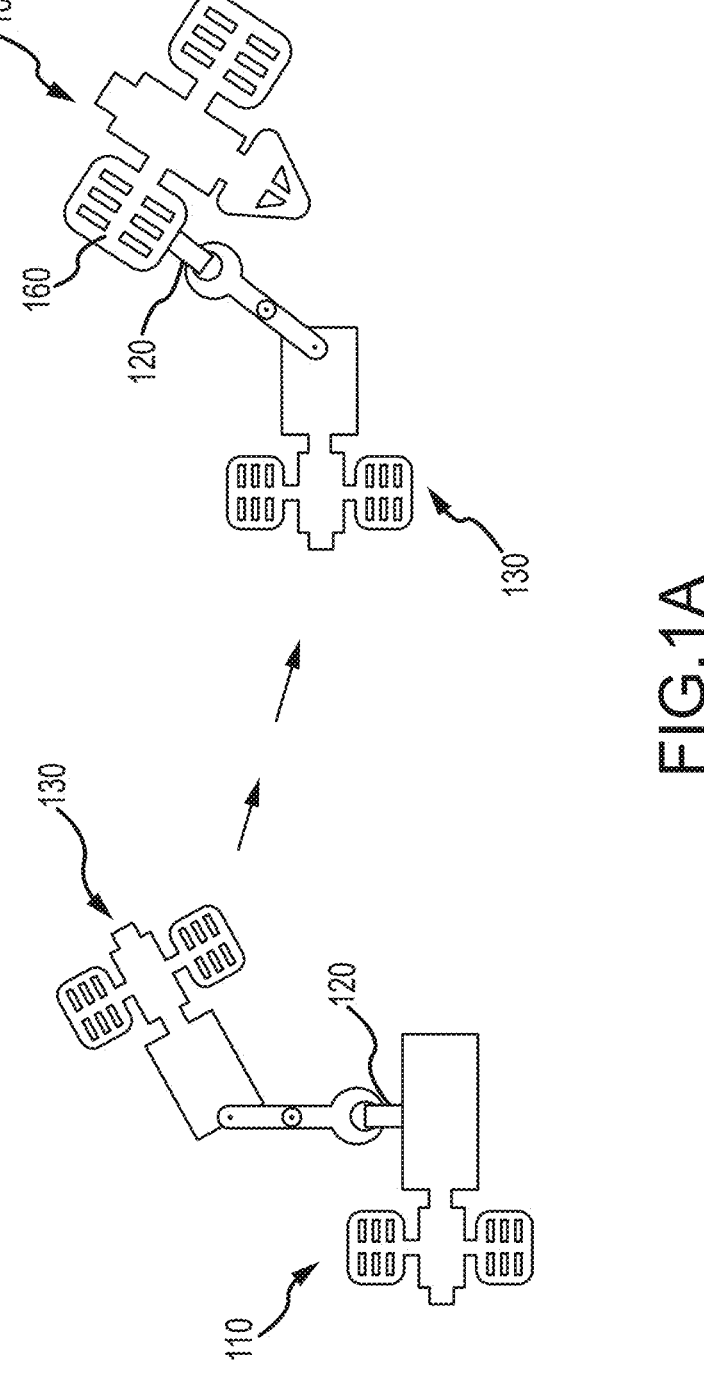
FIG. 1A is an illustration of a transfer vehicle, a service vehicle, a host satellite and a component of a retrofittable satellite system in accordance with the present disclosure.

Persons skilled in the art will readily appreciate that various aspects of the present invention may be realized by any number of methods and apparatuses configured to perform the intended functions. Stated differently, other methods and apparatuses may be incorporated herein to perform the intended functions. It should also be noted that the accompanying drawing figures referred to herein are not all drawn to scale but may be exaggerated to illustrate various aspects of the present invention, and in that regard, the drawing figures should not be construed as limiting. Finally, although the present invention may be described in connection with various principles and beliefs, the present invention should not be bound by theory.

The above being noted and as will be described in more detail below, the present disclosure contemplates devices and systems that provide new ways to attach various components to satellites, for example, among other purposes, for the upgrade, enhancement, and life extension for satellites. In accordance with the present disclosure and as described in more detail below, exemplary attachment mechanisms are facilitated to attach to existing and/or commonly found components already present on the satellites.

Additionally, in accordance with the present disclosure, exemplary components that may be attached to the satellites may include, among other components, enhancement modules for adding one or more capabilities to on-orbit host satellite, modifying the function of the on-orbit host satellite, and/or extending the functions of on-orbit host satellites for purposes such as those described in U.S. patent application Ser. No. 18/588,784 entitled "ATTACHMENT SYSTEMS FOR AUGMENTING SATELLITES," filed on Feb. 27, 2024, U.S. patent application Ser. No. 18/143,780 entitled "MULTI-COMPONENT SATELLITE NETWORK," filed on May 5, 2023, and U.S. patent application Ser. No. 18/143,744 entitled "MULTI-COMPONENT MULTI-SATELLITE NETWORK," filed on May 5, 2023, and U.S. patent application Ser. No. 18/035,570 entitled "ATTACHMENT SYSTEMS FOR AUGMENTING SATELLITES," filed on May 5, 2023, PCT/IB2021/060284, entitled "DEVICES, SYSTEMS AND METHODS FOR AUGMENTING SATELLITES," filed Nov. 5, 2021, and U.S. Provisional Patent Application No. 63/198,692, entitled "NOVEL METHOD TO AUGMENT EXISTING SATEL- LITES WITH SITUATIONAL AWARENESS SENSING CAPABILITY," filed Nov. 5, 2020, all of which are incorporated by reference in their entirety for all purposes.

In accordance with the present disclosure, the attachment mechanisms allow a satellite, particularly though already in orbit (or simply, "host satellite") to be retrofitted with a component. In this regard, "retrofit" or "retrofittable" refers to the addition of a new device to an original device (i.e., a satellite) that was not available, necessary, or present when the original device was manufactured. In the context of the present disclosure, the component is retrofit to the host satellite to add capabilities to or otherwise modify a function of the host satellite. The component may also extend a capability or a function of the host satellite. In accordance with various alternative aspects of the present disclosure, components may also be attached to host satellites on Earth and/or prior to being placed in orbit and/or may be removed or swapped with other components once in orbit. Additionally, in accordance with various aspects of the present disclosure, devices for attaching components to Marman rings on an on-orbit host satellite, particularly those that lack or are without any independent attachment interfaces for receiving a component are provided.

In accordance with various aspects of the disclosure, the component may comprise a component transmitter configured to provide communication of component data with a communications device remote from (i.e., not part of or immediately proximate to) the on-orbit host satellite. The component data may comprise data such as component state information and component payload data. For example, in accordance with various aspects of the disclosure, the components may comprise various operational routines such as, after the component is attached to the on-orbit host satellite, running a calibration routine using state data from both the on-orbit host satellite and the component to determine the orientation of the component relative to the on-orbit host satellite. For example, such a routine helps ensure the component is appropriately oriented (e.g., orthogonal) to the satellite after it has been attached.

Figure 1B:
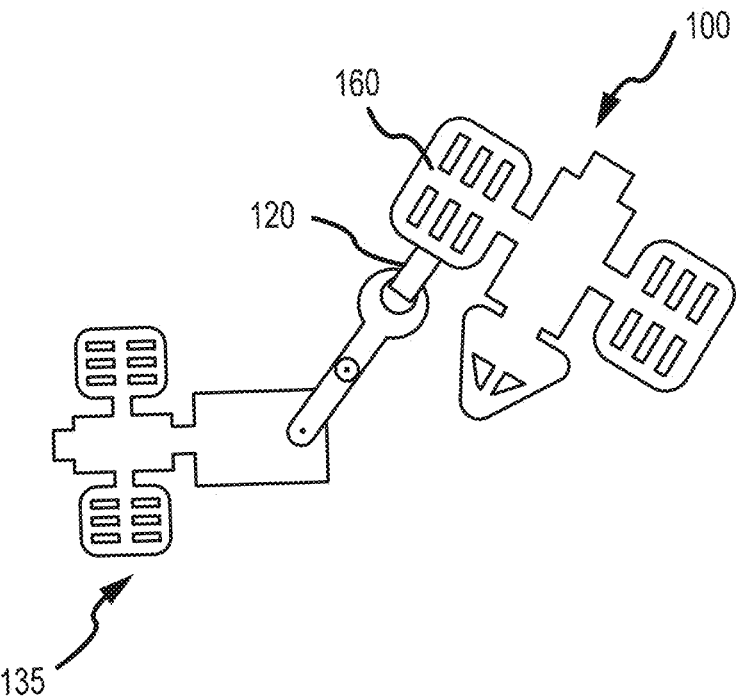
FIG. 1B is an illustration showing a transfer vehicle also being used as a service vehicle, a host satellite and a component of a retrofittable satellite system in accordance with the present disclosure.

In accordance with the present disclosure, with reference to FIG. 1A, a system which uses the attachment mechanisms contemplated herein may comprise a transfer vehicle 110 for transferring the component 120 from a first location to a second location. For example, the first location may be Earth or a component transport spacecraft and the second location may be a location proximate a service vehicle 130. The service vehicle 130 receives the component 120 from the transfer vehicle 110 and takes the component 120 to a host satellite 100 for attachment or installation on the host satellite 100. In accordance with some aspects of the present disclosure and with reference to FIG. 1B, the transfer vehicle and the service vehicle may be the same vehicle 135, such that it both transfers the component 120 from the first location (e.g., Earth or a spacecraft) to the host satellite 100 (the second location), where in turn it adds or removes components 120 to/from the host satellite 100 (as described herein).

In accordance with the present disclosure, in addition to the attachment or installation of components 120 to host satellites 100, the service vehicle 130 may also remove components 120 and other components from host satellites 100, for example, for replacement with new components 120 with new or different capabilities or with the same, for example, to extend the life of the mission of the host satellite 100.

Figure 2:
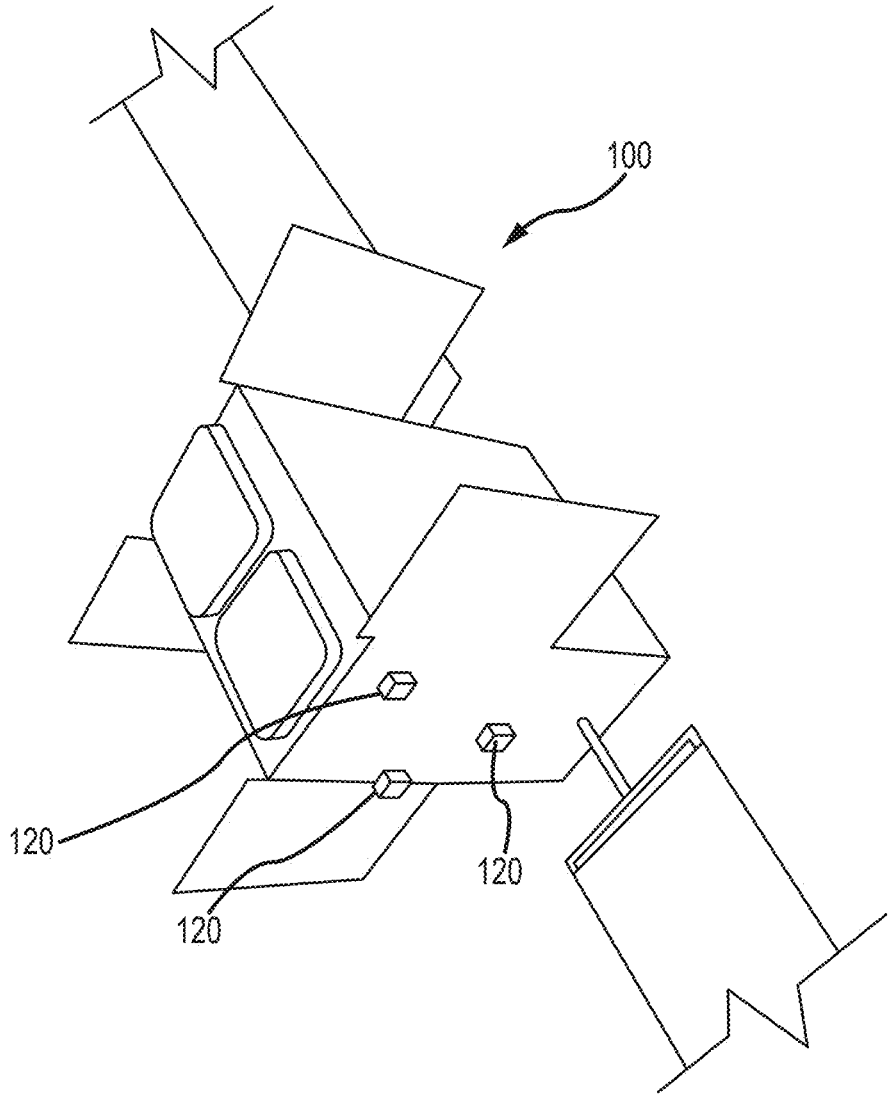
FIG. 2 is a perspective view of a host satellite with components attached thereto in accordance with the present disclosure.
Figure 3:
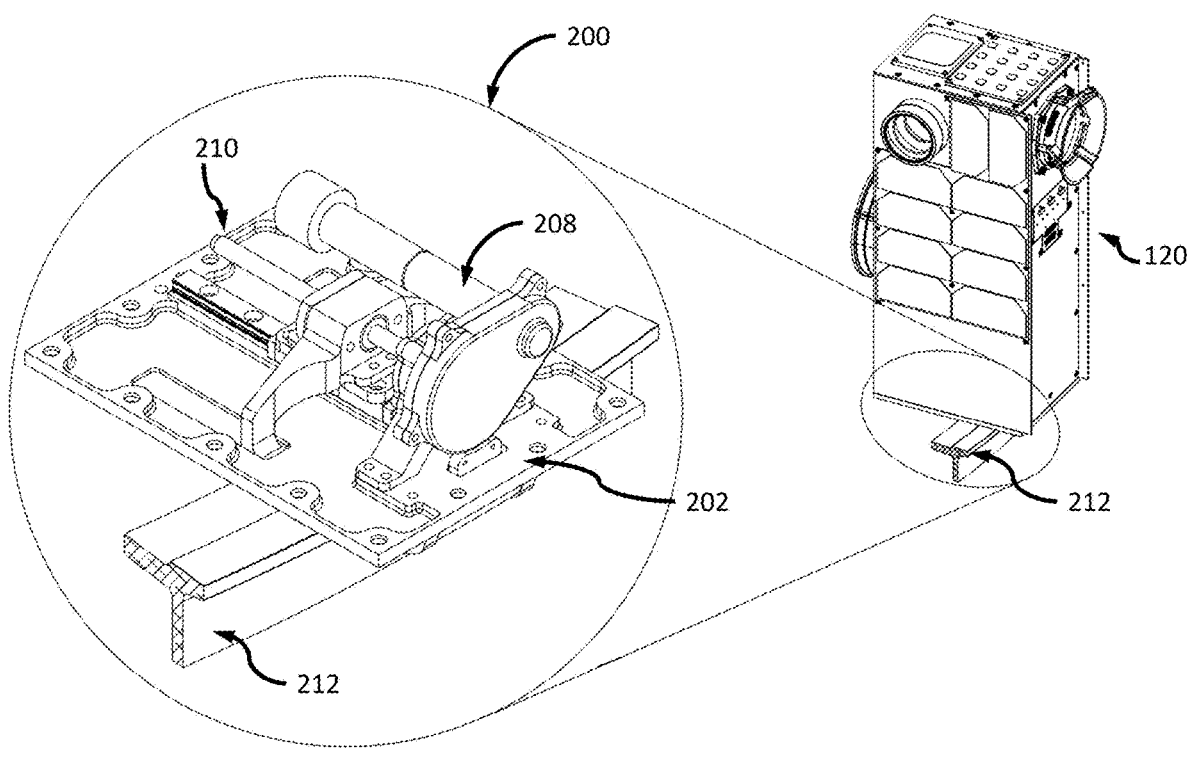
FIG. 3 are perspective views of a clamp attached to the bottom of a component and secured to a Marman ring in accordance with the present disclosure.

In accordance with the present disclosure, the component 120 may be attached (as described below) to the host satellite 100 and operate independently of the functionality of the host satellite 100, though in other applications, the component 120 may be functionally installed on the host satellite 100 such that it communicates and operates with the existing functionality of the host satellite 100. Additionally, in accordance with various aspects of the present disclosure, the transfer vehicle 110 may carry multiple components 120 of similar or varying capabilities, and the service vehicle 130 may install multiple components 120 on one or more host satellites (e.g., as shown FIG. 2).

The attachment mechanism(s) facilitates the connection of the component 120 to the host satellite. In accordance with various aspects of the present disclosure, the attachment mechanism may provide a secure mounting point with no electrical interface or communication (i.e., with control system, power supply, or the like) between the component 120 and the host satellite 100.

For example, in this regard and in accordance with various aspects of the present disclosure, the attachment mechanism may comprise a clamp such as those illustrated in FIGS. 3-7 for attaching the component 120 to a Marman ring on the on-orbit host satellite 100 even in cases where the satellite 100 lacks any other independent attachment interfaces for receiving the component 120. Notably, Marman rings are not specifically designed and configured for receiving components, payloads or similar components contemplated herein but rather are simply part of the base structure or body of satellites 100.

With continuing reference to FIGS. 3-7, clamps 200 for attaching components 120 to a Marman ring of the on-orbit host satellite even in cases where the satellite 100 lacks any other independent attachment interfaces for receiving the component is contemplated. In these exemplary embodiments, the clamp 200 may comprise a baseplate 202 to support the clamp 200 components and facilitate attachment to the component 120, a first tooth assembly and a second tooth assembly (of a variety of configurations such as those described below and illustrated in the noted Figures) which can contract by operation of a motor and drive assembly 208 by translating the first and second tooth assemblies towards one another along a linear motion axis 210 (e.g., a rail or the like). In various embodiments, a motion limiter such as a stop may be provided to prevent travel of the tooth assemblies beyond a pre-determined point.

In accordance with the present disclosure, actuation of the motor and drive assembly 208 translates the linear motion axis 210 such that at least one of the of the first and second tooth assemblies contract to clamp on to a Marman ring 212 on the on-orbit host satellite.

As noted above, any number of tooth assembly configurations are contemplated and may fall within the scope of the present invention. For example, with specific regard to FIG. 4, the first and second tooth assemblies may comprise at least one rigid tooth 204, if not two or more, and a pivoting tooth assembly 206 which can contract by operation of the motor and drive assembly 208 by translating the teeth 204 and/or tooth assembly 206 towards one another along the linear motion axis 210 (e.g., a rail or the like).

In the various embodiments, the rigid teeth 204 may comprise a kinematic clamp (i.e., a mechanism designed to precisely retain and locate a component) having angled surfaces 205 such that when the first and second tooth assemblies contract towards one another onto the Marman ring 212, the clamp 200 is pulled along the angled surfaces 205 in a desired direction to a desired location so that the baseplate 202 of the clamp 200 is pulled towards the Marman ring 212 and ensures a final desired position and orientation relative to the Marman ring 212.

In accordance with various aspects of the present disclosure, the clamp 200 may further comprise a position sensor to determine a relative position of the first and second tooth assemblies. Additionally, in accordance with some aspects, a mechanical behavior of the first tooth assembly and second tooth assembly may be calculated to allow the determination of a preload force applied to the Marman ring based on a location of the Marman ring and a relative position of the first and second tooth assemblies. For example, the mechanical behavior may be the material stiffness of the system, particularly, the tooth assemblies and is defined by the resultant spring constant of the tooth assembly materials and their respective configurations. Thus, by using the spring constant and an amount of deflection of a particular tooth assembly (which is derived from the position sensor), the force applied to the Marman ring by the tooth assemblies can be determined and adjusted.

In the various embodiments, the tooth assembly 206 may comprise a camming tooth 207 pivotally connected to a tooth support structure 209. In such a configuration, when the teeth 204 and the tooth assembly contract towards one another onto, for example, a Marman ring 212, the shape and ability of the camming tooth 207 to pivot both laterally secures the clamp 200 to the Marman ring 212, while also pulling the clamp in a direction generally orthogonal to contracting direction so that the baseplate 202 of the clamp 200 is pulled as close as possible to the Marman ring 212. The pivoting of the camming tooth 207 may also provide for preloading the clamp 200 to the Marman ring 212 to provide an extra tightening force and ensure a secure connection therebetween.

Figure 4:
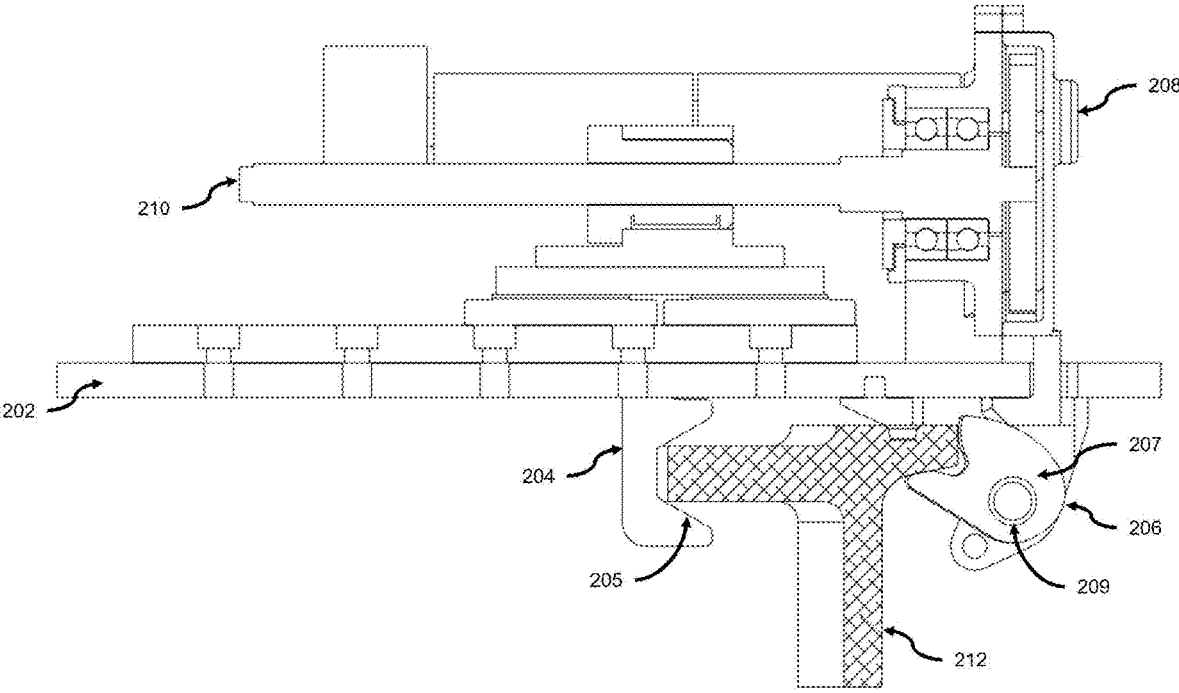
FIG. 4 is a cross-sectional view of a clamp secured to a Marman ring in accordance with the present disclosure.
Figure 5:
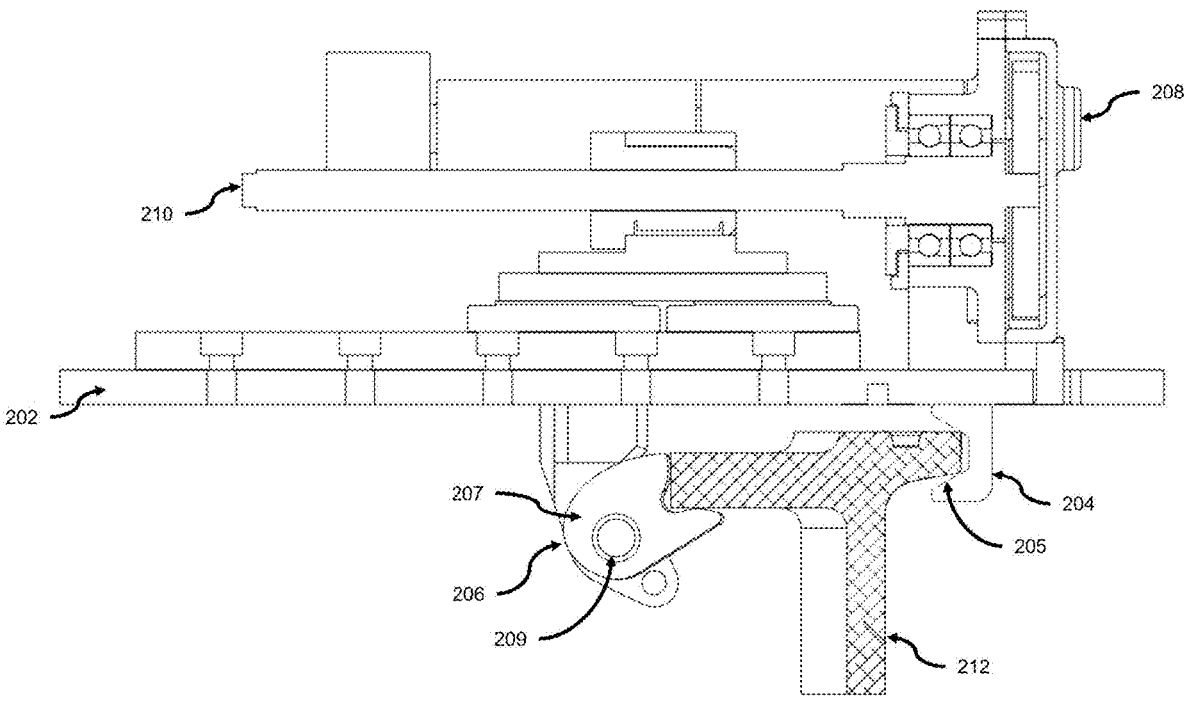
FIG. 5 is a cross-sectional view of an alternative embodiment of a clamp secured to a Marman ring in accordance with the present disclosure.
Figure 6:
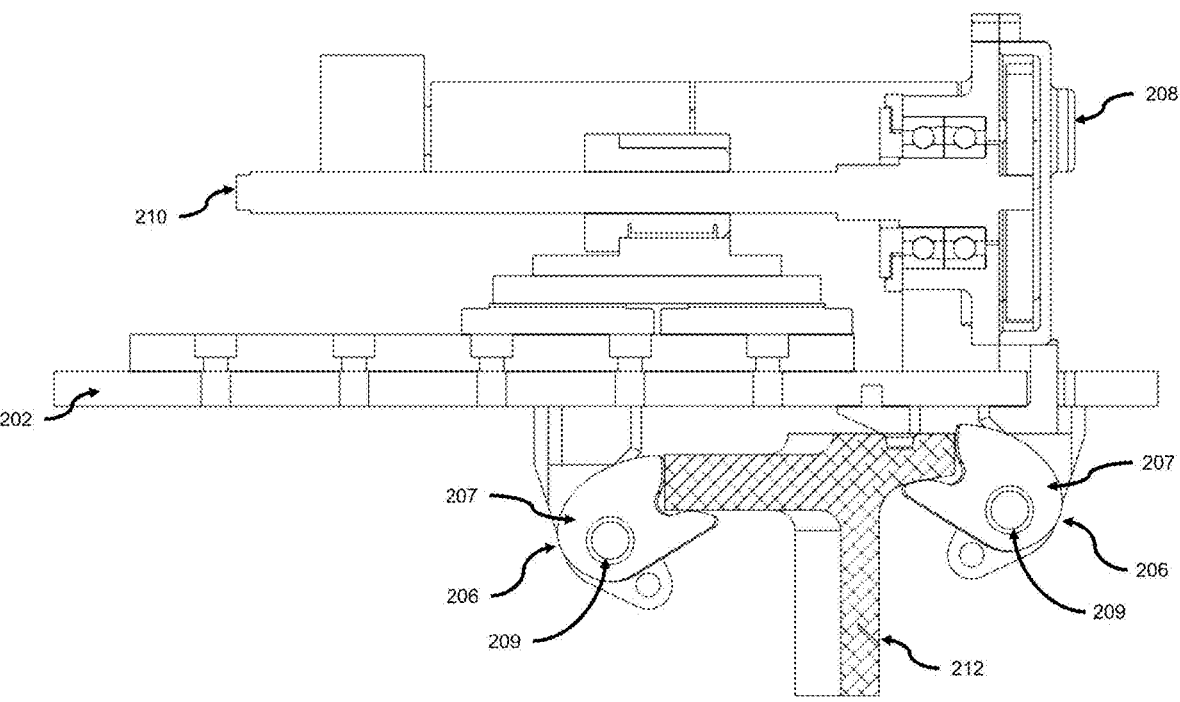
FIG. 6 is a cross-sectional view of another alternative embodiment of a clamp secured to a Marman ring in accordance with the present disclosure.
Figure 7:
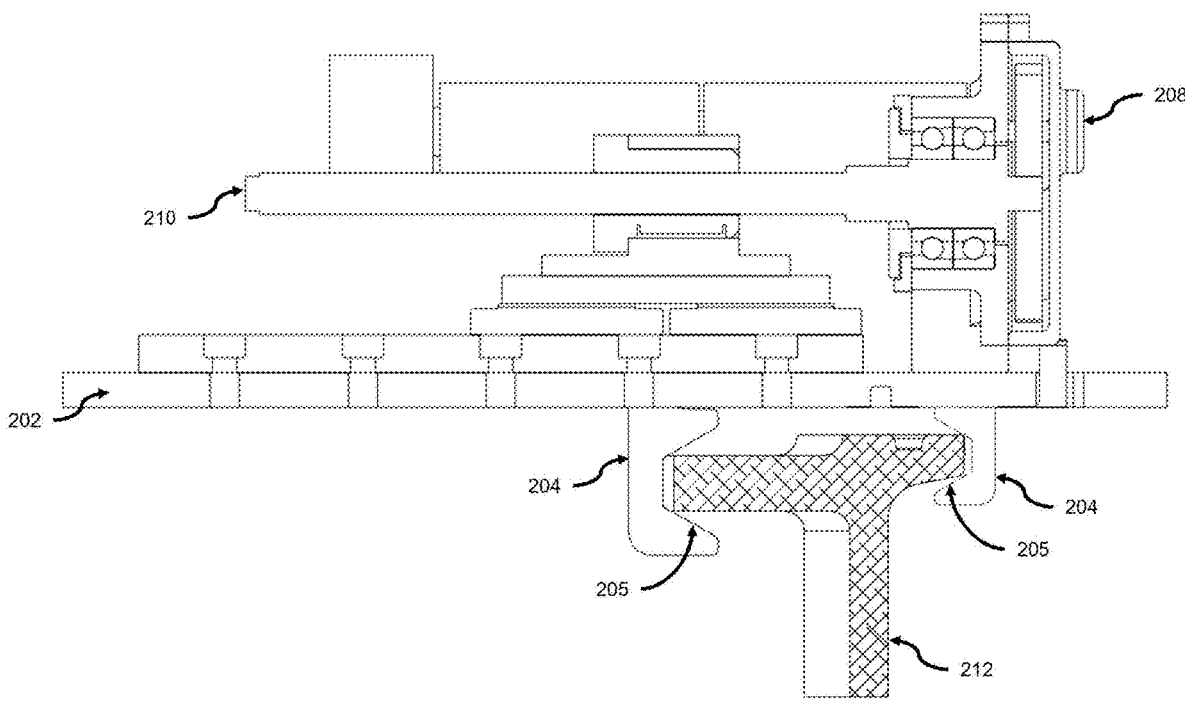
FIG. 7 is a cross-sectional view of another alternative embodiment the of a clamp secured to a Marman ring in accordance with the present disclosure.

As illustrated in FIG. 4, the teeth 204 may be located proximate to an inner surface of the Marman ring 212 and the tooth assembly 206 is located proximate to an outer surface of the Marman ring 212. However, in various alternative configurations such as illustrated in FIG. 5, the teeth 204 are located proximate to an outer surface of the Marman ring 212 and the pivoting tooth assembly 206 is located proximate to an inner surface of the Marman ring 212. In still other alternative configurations and with reference to FIGS. 6 and 7, respectively, both the first and second tooth assemblies may comprise pivoting tooth assemblies or both the first and second tooth assemblies may comprise rigid teeth.

In accordance with the present disclosure, the components 120 provide any number of increased or enhanced capabilities, such as space situational awareness capabilities, including for example, space traffic management, local situational awareness, orbital data and various other information related to the space surrounding the host satellite 100 to which the component 120 is attached. Components 120 in accordance with the present disclosure may also allow "mission extension" capabilities. For example, older host satellites 100 that be nearing the end of their functional relevance of capabilities may have components 120 retrofitted to them to provide new capabilities or improve or extend the life of old capabilities, such Earth to orbit satellite communications, global positioning system (GPS), optical and radio telescopic, etc. The components 120 may also provide the ability to add power to the host satellites 100 and/or reposition host satellites 100 that are losing or have lost the ability to reposition (if they ever had the ability).

In accordance with various aspects of the present disclosure, the components 120 may also provide the ability for components 120 to communicate with one another on the same host satellite 100, different host satellites 100, or both, which in turn can add new capabilities related to the various situational awareness functionalities mentioned above and described in more detail hereinbelow.

Finally, it will be apparent to those skilled in the art that various modifications and variations can be made in the present invention without departing from the spirit or scope of the invention. For example, numerous materials, shapes, sizes and configurations can be substituted in place of those described herein. Thus, the present disclosure covers the modifications and variations provided they come within the scope of the appended claims and their equivalents.

We claim:

1. A clamp for attachment to a satellite, wherein the satellite is without an independent attachment interface for receiving the clamp, comprising:

a baseplate for attachment to a component;

a motor and a drive assembly;

a linear motion axis;

a first rigid tooth and a second camming tooth pivotally connected to a tooth support structure;

a Marman ring on the satellite; and wherein, actuation of the motor and the drive assembly translates the linear motion axis such that at least one of the first rigid tooth and the second camming tooth contract towards one another and the camming tooth pivots and laterally secures the clamp to the Marman ring by pulling the clamp in a direction orthogonal to the contracting direction so that the baseplate of the clamp is pulled towards the Marman ring securing the clamp on the Marman ring.

2. The clamp for attachment to a satellite of claim 1, wherein the first rigid tooth comprises angled surfaces such that when the first rigid tooth and the second camming tooth contract towards one another onto the Marman ring, the Marman ring is pulled along the angled surfaces in a desired direction to a desired location so that the baseplate of the clamp is seated in a desired position with respect to the Marman ring.

3. A clamp for attachment to a satellite, wherein the satellite is without an independent attachment interface for receiving the clamp, comprising:

a baseplate for attachment to a component;

a motor and a drive assembly;

a linear motion axis;

a first camming tooth and a second camming tooth both pivotally connected to a tooth support structure;

a Marman ring on the satellite; and wherein the first camming tooth is pivotally connected to a first tooth support structure and the second camming tooth is pivotally connected to a second tooth support structure, wherein when the first camming tooth and the second camming tooth contract towards one another onto the Marman ring, the first camming tooth pivots and the second camming tooth pivots to laterally secure the clamp to the Marman ring and pulls the clamp in a direction orthogonal to the contracting direction so that the baseplate of the clamp is pulled towards the Marman ring securing the clamp on the Marman ring.

4. The clamp for attachment to a satellite of claim 1, wherein a position sensor is used to determine a relative position of the first rigid tooth and the second camming tooth.

5. The clamp for attachment to a satellite of claim 4, wherein a mechanical behavior of the first rigid tooth and second camming tooth are calculated to allow a determination of a preload force applied to the Marman ring based on a location of the Marman ring and a relative position of the first rigid tooth and second camming tooth.

6. The clamp for attachment to a satellite of claim 1, further comprising a stop.

7. The clamp for attachment to a satellite of claim 3, further comprising a stop.

\* \* \* \* \*